Figure 1:
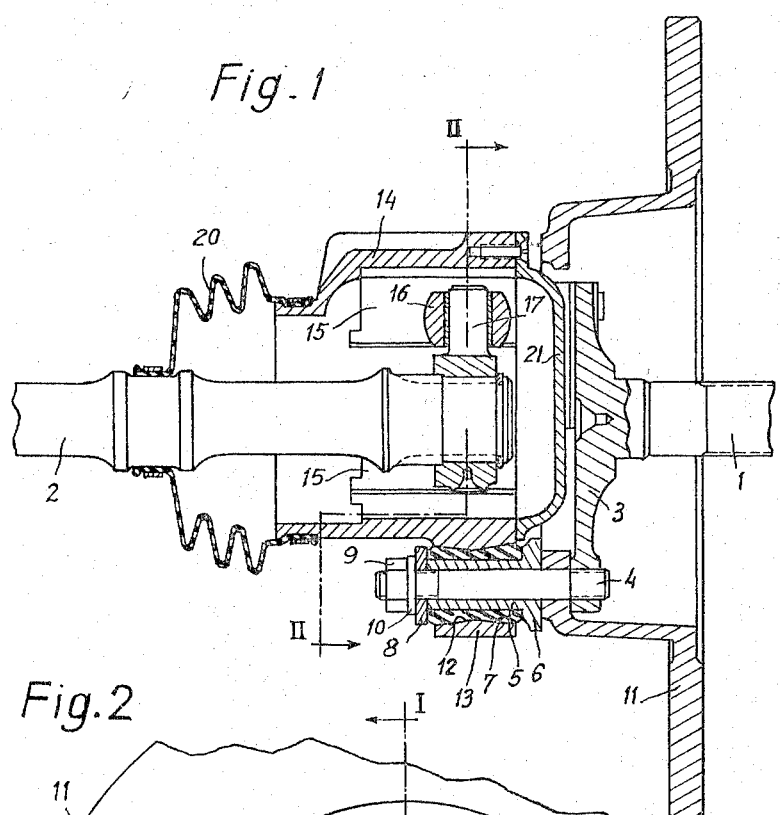

May 9, 1967 J. CADIOU 3,318,108
ELASTIC UNIVERSAL SLIDING JOINT FOR DRIVING HALF-SHAFTS
OF MOTOR VEHICLE DRIVING WHEELS
Filed July 15, 1965

Jean Cadiou,
Inventor
By Wenderoth, Lind and Ponack
Attys

United States Patent Office 3,318,108
Patented May 9, 1967

3,318,108
ELASTIC UNIVERSAL SLIDING JOINT FOR DRIVING HALF-SHAFTS OF MOTOR VEHICLE DRIVING WHEELS
Jean Cadiou, Paris, France, assignor to Societe Anonyme Andre Citroen, Paris, France, a corporation of France
Filed July 15, 1965, Ser. No. 472,115
Claims priority, application France, July 23, 1964, 982,836, Patent 1,409,909
4 Claims. (Cl. 64—8)

It is known that in most cases the mechanisms for transmitting the drive to the road wheels of an automotive vehicle, which comprises two separate axle shafts, must be capable of allowing a certain axial movement so that the suspension may work freely.

To this end, sliding joints of the stud or spline type have been used, as well as devices of the type comprising elastic studs or blocks permitting a certain elastic variation in length, or combinations of these two systems.

The use of sliding joints is objectionable in that when a torque is transmitted therethrough the driving effort applied between the sliding surfaces prevents any sliding motion as long as the axial force due to the play remains inferior to a certain value of the product $F \times f$ (threshold of sliding motion) wherein F is the driving effort and $f$ the coefficient of friction produced between the sliding joint component elements. As long as this threshold is not attained, the members cannot slide and small shocks are transmitted, and constitute a source of noise. Clearing this threshold may also be noisy.

On the other hand, in a prior Patent No. 2,844,012 of July 22, 1958, a solution was proposed for avoiding the drawbacks disclosed hereinabove. This solution implied the use of a coupling consisting of a series of rubber blocks disposed in recesses formed in the outer periphery of a first annular member in which said blocks are compressed, the teeth of another annular member concentric with said first annular member and connected to the axle shaft proper being adapted to be imbricated into said recesses. These rubber blocks have a rather complicated shape with a convex face adapted to co-act with the concave faces of said teeth. As this coupling has an axial elasticity greater than its torsional elasticity, it is capable of rotatably driving the axle shaft as rigidly as possible while absorbing small longitudinal or axial variations in the case of efforts below said sliding threshold.

However, this construction was rather complicated and involved the use of rubber blocks having a special shape, and therefore it is the object of the present invention to avoid this inconvenience in a transmission structure providing by itself a free axial movement nearly completely insensitive to the torques transmitted thereby.

The elastic sliding universal joint interconnecting two rotary members on each one of a pair of axle shafts connected to the drive wheels of an automotive vehicle comprises according to this invention, in combination, a sliding joint of which the sliding movement is moderately sensitive to the transmitted torque and an elastic coupling of the type comprising a rotary plate carrying a plurality of studs covered with sheaths of suitable elastomer which engage corresponding recesses formed in another rotary plate, one of said plates being the driving member and the other the driven member.

The sliding joint comprises a stub shaft rigid with one of the rotary members and provided with radial pivot pins on which rollers are mounted for free sliding and rotational movement, said rollers engaging straight grooves formed in a casing.

The elastic coupling comprises a plate rigid with the other rotary member and carrying pegs or studs each covered with an elastomer sheath and retained by means of these sheaths in corresponding recesses formed externally in said casing.

Of course, the straight grooves, the radial pins of the other rotary member and the studs have substantially parallel axes.

Figure 2:
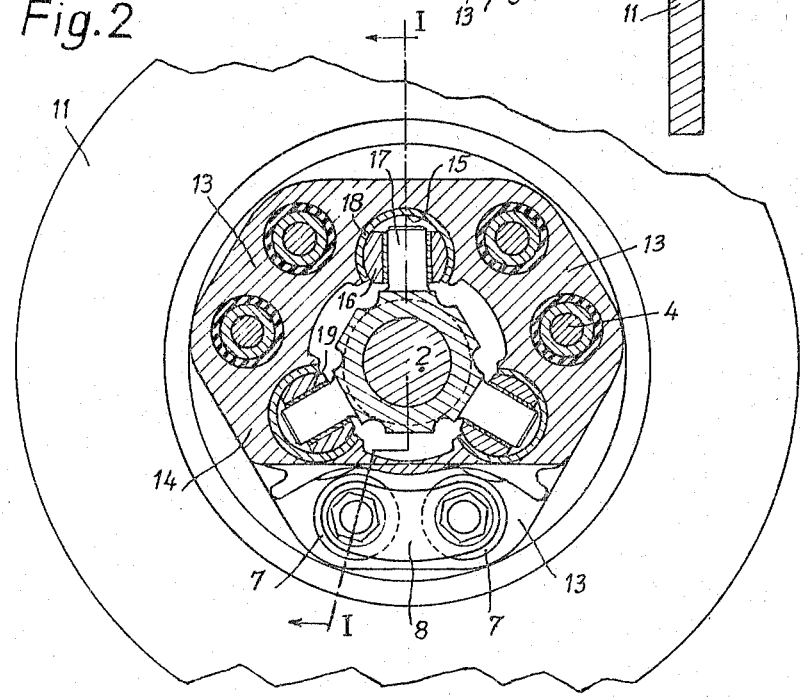

The invention will be better understood from the following description of a specific form of embodiment given by way of example with reference to the accompanying drawing, in which:

FIGURE 1 illustrates a joint according to this invention, shown in axial section, and FIGURE 2 is a cross sectional view of the same joint, the section being taken upon the line II—II of FIGURE 1.

The joint illustrated in the drawing by way of example is mounted in one of the pair of axle-shafts propelling a driving and steerable road wheel. The driving shaft is one of the two output shafts 1 of a transmission and final-drive mechanism (not shown). The driven shaft 2 connects the joint to the wheel through a homokinetic joint (not shown).

The shaft 1 carries at its end a drive plate 3 having screwed in its outer periphery three studs or pairs of studs 4 parallel to the shaft, these studs or pairs of studs being spaced angularly 120° apart.

Each stud 4 carries a socket 5 acting as a distance-piece which is formed with a shoulder 6 at its inner end, this socket 5 is covered with an elastic sheath 7 of suitable elastomer such as synthetic rubber, which is retained in engagement with said shoulder 6, and a two-hole strip 8 interconnecting the two studs of a pair. These elements are locked by means of a nut 9 and a washer 10. A brake disc 11 has six holes formed therethrough which are engaged by said studs, the disc being clamped between the aforesaid shoulders 6 and the drive plate 3. The brake disc shoes are not shown.

The elastic sheaths 7 engage without play correspondingly shaped recesses 12 formed in three radial projections 13 carried by a joint casing 14. These sheaths may also fit elastically with a certain degree of prestress in the space available between the wall of said recesses and the socket 5. Alternately, these sheaths may be cemented or cured on the wall and/or on the socket.

The component elements described hereinabove are part of the elastic coupling of the joint of this invention.

The casting 14 is also an integral part of the sliding joint construction and has formed therein three straight grooves 15 substantially parallel to the axis of the driving shaft 1, the side faces of these grooves having a cylindrical contour.

Each groove 15 has mounted therein for free sliding and rotational movement a barrel-shaped roller 16 carried by a radially extending pivot pin 17 rigid with said driven shaft 2. Thus, the end portion of this shaft 2 which extends within the casing 14 carries three radial pins 17 having their axes spaced 120 degrees apart.

The internal surface of said grooves 15 may be lined with a bushing 18 made from a material having a better wearing resistance than the metal of said casing. The same applies to the rollers 16 which may be lined with bushings 19.

Finally, the casing 14 may be protected from the ingress of dust on the one side by means of a flexible dust-seal bellows 20 of leather or synthetic rubber having its ends clamped by collars on the driven shaft 2 and on the casing 14, and on the other side by means of a metal cover 21 secured by screws on said casing.

With this arrangement, the fastening on the driving shaft, the fastening of the sliding joint casing and of a brake disc are simultaneously obtained in a very simple manner.

The arrangement is such that the disc is positively secured and has the necessary position stability, and on the other hand the homokinetic joint is resiliently mounted.

The dimensions and shape of the elastic component elements will be selected as a function of the directions and amplitude of the vibration to be absorbed. In most cases it will be advantageous to endeavor to damp out rotational vibration.

I claim:

1. Universal elastic sliding joint for an output shaft of an automotive vehicle connecting two rotary members comprising on one hand a sliding coupling comprising a casing having straight grooves therein, a stub shaft fixed to one of said rotary members, radially extending pivot pins on said stub shaft, rollers mounted on said pins for free sliding and rotational movement engaged in said grooves and, on the other hand, an elastic coupling comprising a plate fixed to the other of said rotary members, a plurality of studs each surrounded by a sheath of elastomer fixed to said plate, a brake disc secured by said studs on said plate, said casing having three radial external projections with recesses in which said sheaths and studs are held and said grooves and the axes of said other rotary member and said studs being substantially parallel.

2. Universal elastic sliding joint as claimed in claim 1, wherein each sheath is biconical in shape.

3. Universal elastic sliding joint as claimed in claim 2, wherein said biconical shape has two frustoconical sections so disposed as to have a common small base.

4. Universal elastic sliding joint as claimed in claim 1, wherein said grooves have side faces of matching cylindrical surfaces and said rollers are barrel-shaped and slide and rotate freely in said grooves.

References Cited by the Examiner
UNITED STATES PATENTS

| | | | |
|---|---|---|---|
| 2,301,600 | 11/1942 | Wilson | 64—11 X |
| 2,517,887 | 8/1950 | Korn | 64—10 X |
| 2,879,650 | 3/1959 | Martin | 64—10 |

FOREIGN PATENTS

| | | |
|---|---|---|
| 1,352,259 | 1/1964 | France. |
| 672,591 | 3/1939 | Germany. |

FRED C. MATTERN, Jr., *Primary Examiner.*

HALL C. COE, *Examiner.*